United States Patent [19]
Stenquist

[11] Patent Number: 5,823,513
[45] Date of Patent: Oct. 20, 1998

[54] DELAY RETURN GAS SPRING

[75] Inventor: Sven Stenquist, Tranas, Sweden

[73] Assignee: Diebolt International, Inc., Plymouth, Mich.

[21] Appl. No.: 874,256

[22] Filed: Jun. 13, 1997

Related U.S. Application Data

[63] Continuation of Ser. No. 520,384, Aug. 29, 1995, abandoned.

[51] Int. Cl.[6] .......................................... F16F 5/00
[52] U.S. Cl. ........................................ 267/64.26; 188/282
[58] Field of Search ................................. 188/282, 284, 188/269, 322.15, 322.21; 267/64.15, 64.26, 124, 126, 119

[56] References Cited

U.S. PATENT DOCUMENTS

| | | | |
|---|---|---|---|
| 2,982,538 | 5/1961 | Carbon | 267/64.15 |
| 3,534,870 | 10/1970 | Daugherty, Jr. | 188/282 |
| 4,383,595 | 5/1983 | Schnitzius | 188/284 X |
| 4,503,951 | 3/1985 | Imaizumi | 267/64.15 X |
| 5,303,804 | 4/1994 | Spiess | 188/322.15 X |
| 5,507,475 | 4/1996 | Seel et al. | 188/322.15 X |

*Primary Examiner*—Lee W. Young
*Attorney, Agent, or Firm*—Barnes, Kisselle, Raisch, Choate, Whittemore & Hulbert

[57] ABSTRACT

A gas spring that momentarily dwells in its retracted position after the retraction force is removed. The gas spring has a casing, a first piston received within the casing, a piston rod protruding from the casing and connected to the first piston, and a second piston received within the casing. A compressible gas is received within the casing between the second piston and the other end of the casing. A hydraulic fluid is received within the casing between the first and second pistons and between the first piston and the one end of the casing. A delay valve and a check valve carried by the first piston controllably transfer hydraulic fluid between the two fluid chambers, the delay valve causing the first piston and rod to dwell in the retracted position by delaying the free transfer of fluid between chambers.

15 Claims, 2 Drawing Sheets

DELAY RETURN GAS SPRING

This application is a continuation of application Ser. No. 08/520,384, filed Aug. 29, 1995, now abandoned.

FIELD OF THE INVENTION

This invention relates to gas springs, and more particularly to a gas spring having a piston with a delayed return stroke.

BACKGROUND OF THE INVENTION

A typical gas spring for die stamping applications is constructed with an actuating rod connected to a piston slidably received in a cylinder having a cavity which is precharged at a predetermined pressure with an inert gas such as nitrogen. When the rod and piston are forced into the cavity, the gas therein is compressed to a maximum operating pressure which is dependent on the volume of the cavity and the effective area and stroke of the piston. When the force applied to the rod is removed, the compressed gas within the cavity immediately forces the piston and rod to its fully extended position.

In some applications, the drive mechanism of a stamping press includes a crank and meshed gears. On the down or advancing stroke of the press, the force of a drive gear is applied through the meshed gear teeth to one face of the follower gear teeth. This closes the stamping dies and causes the rod and piston to retract and compress the gas within the cavity. As the press drive mechanism goes through the transition from the down stroke to the return stroke, the gear mechanism momentarily passes through a no-load or neutral position. Through the neutral position, as the force applied by the drive gear changes from advancing the die to returning the die, a period occurs where the drive gear teeth do not apply a load to the follower gear teeth.

A problem developes because a typical drive mechanism of this type has free play or back lash of about 0.060 inches. As the press goes from the downward stroke to the return stroke, a typical gas spring applies an immediate force through the piston rod to the dies in the press. This immediate force is transmitted through the drive mechanism of the press accelerating the follower gear through the neutral position causing the follower gear teeth to slam into the other face of the drive gear teeth. This causes excessive wear and damage to the gear teeth and premature gear failure which is costly and time consuming to repair.

SUMMARY OF THE INVENTION

In accordance with this invention, the gas spring momentarily dwells in its compressed condition long enough for the drive mechanism to pass through the neutral zone and the drive gear teeth to re-engage the follower gear teeth before the gas spring load is transmitted through the dies to the press drive mechanism and gears.

The gas spring has a casing, a first piston received within the casing, a piston rod protruding from one end of the casing and connected to the first piston, and a second piston received within the casing between the first piston and the other end of the casing. A compressible gas is received within the casing in a gas chamber between the second piston and the other end of the casing. An incompressible hydraulic fluid is received within the casing in a first fluid chamber between the one end of the casing and the first piston and in a second fluid chamber between the first and second pistons. A delay valve and a check valve are disposed within the first piston for transferring fluid between the fluid chambers.

As force is applied to the piston rod, the first piston retracts toward the other end of the casing causing a higher fluid pressure in the second fluid chamber. Some fluid passes through the check valve to the first fluid chamber. To maintain a constant total fluid chamber volume, the second piston retracts, compressing the gas in the gas chamber. When the force is removed from the rod and first piston, the compressed gas applies a force to the second piston which in turn causes a higher fluid pressure in the first fluid chamber. The delay valve momentarily blocks fluid flow from the first fluid chamber back to the second fluid chamber causing the first piston to dwell in the retracted position. When the delay valve opens, fluid flows to the second fluid chamber which in turn allows the first piston and rod to move back to their extended positions.

Objects, features and advantages of the invention are to provide a self contained gas spring which has delay return characteristics, requires no external hydraulic fluid or gas reservoirs and piping, requires no external electrical control or delay circuitry, can be used on existing die stamping equipment, requires no modification of the existing equipment for installation, has a long in-service useful life, and is self-contained, rugged, durable, reliable, of relatively simple design and economical manufacture and assembly.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
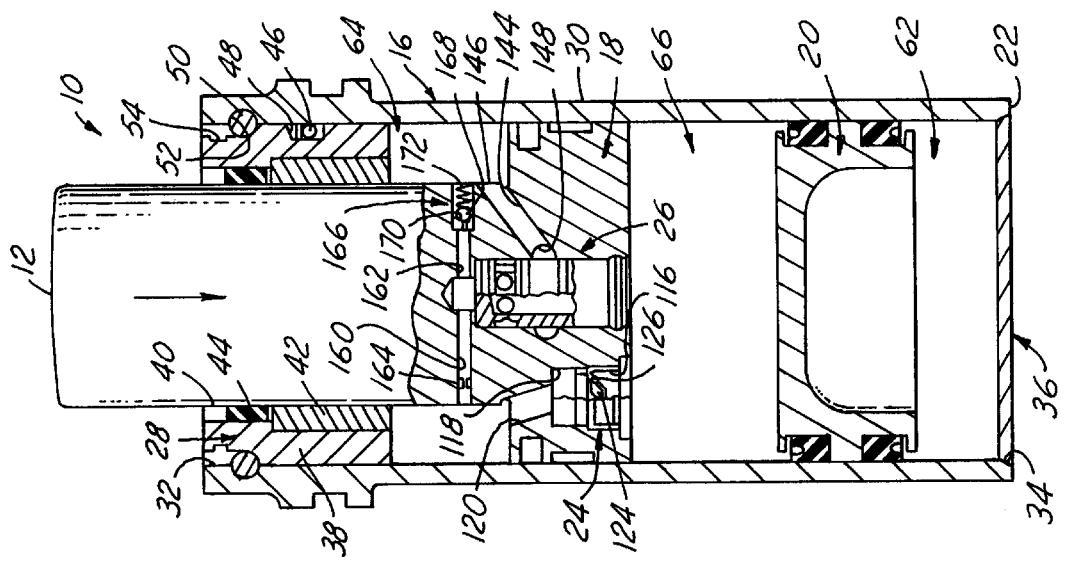
FIG. 1 is a fragmentary sectional view of a gas spring according to the invention shown with the first piston having commenced the downstroke.
Figure 2:
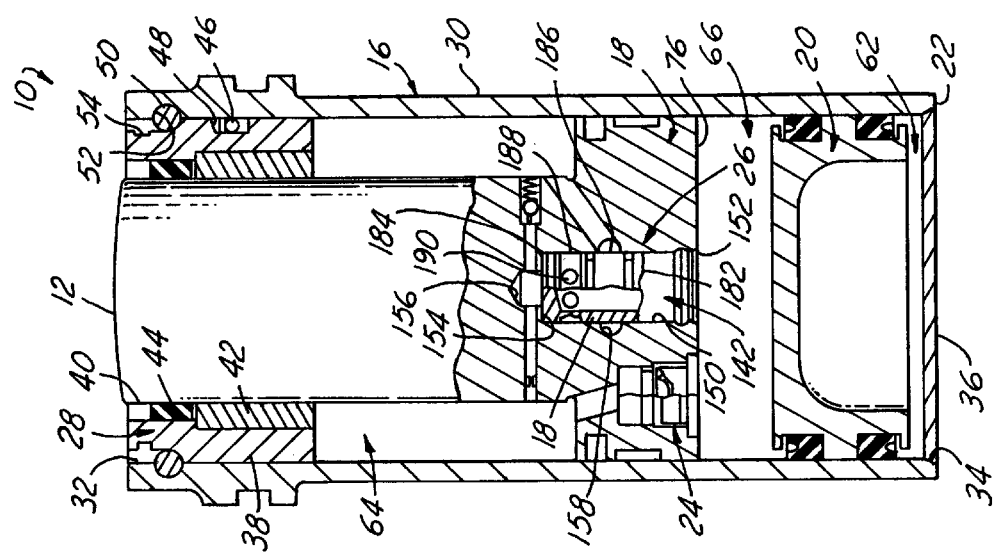
FIG. 2 is a fragmentary sectional view of the gas spring shown in FIG. 1 with the first piston shown in the fully retracted position.
Figure 3:
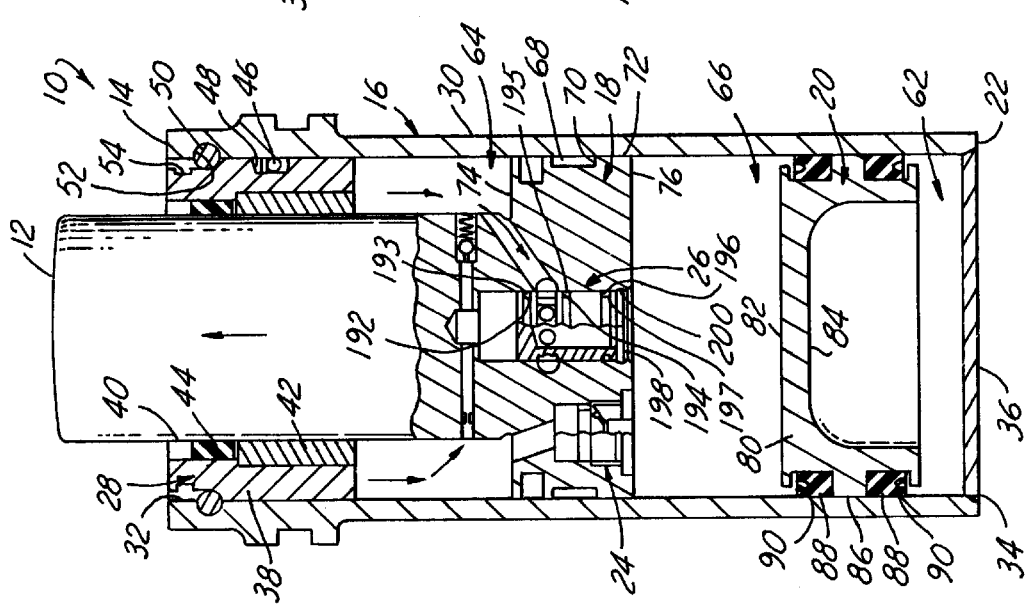
FIG. 3 is a fragmentary sectional view of the gas spring shown in FIG. 1 with the first piston having commenced the return stroke.

Referring in more detail to the drawings, FIGS. 1–3 illustrate a gas spring 10 with a piston rod 12 protruding from one end 14 of a casing 16 and connected to a first piston 18 slidably received within the casing. A second piston 20 is disposed between the first piston and the other end 22 of the casing. A check valve assembly 24 and delay valve assembly 26 are disposed within the first piston. A bearing and seal assembly 28 is fitted in the one end 14 to seal off the one end and to provide a seal around the piston rod 12.

Figure 4:
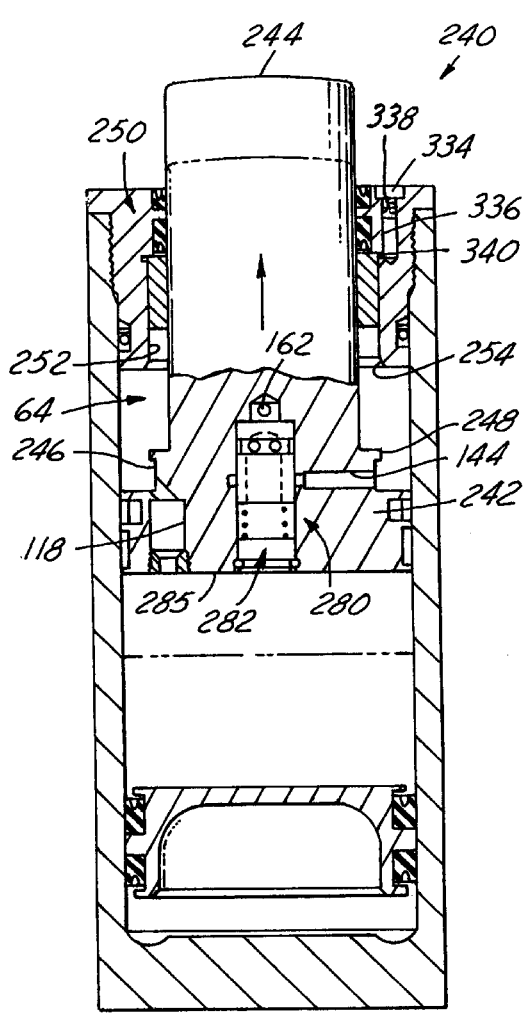
FIG. 4 is a fragmentary sectional view of another preferred embodiment of a gas spring according to the invention showing the rod moving toward a retracted position with the delay valve in its closed position.

As shown in FIG. 1, the casing 16 comprises an elongate tube 30 having openings 32 and 34 at its ends. An end cap 36 is fitted into the opening 34 and welded to the tube to seal off the end 22 of the casing. As shown in FIG. 4, the end cap 36 may be formed integrally with the tube 30.

The piston rod 12 is axially disposed within the casing 16 and projects from the casing through the opening 32. The first piston 18 is axially reciprocable within the casing 16 and connected to the rod 12 for axial movement therewith. The bearing and seal assembly 28 is received within the opening 32 and has an annular housing 38 defining a central rod opening 40 through which the piston rod 12 extends. The piston rod 12 is guided for axial reciprocation by a rod bearing 42 press fit into the housing 38. The rod bearing 42 is preferably formed of sintered bronze as a ring shaped sleeve and impregnated with lubricant. Also disposed within the rod opening 40 is a rod seal 44 carried by the housing 38 and providing a fluid seal between them. A fluid seal is provided between the casing 16 and housing 38 by an O-ring 46 received in an annular ring groove 48 in the housing 38. To retain the bearing and seal assembly 28 within the opening 32, a split ring 50 is received in an annular groove 52 between them. A dust cap (not shown) is received in a groove 54 in the casing 16.

The second piston 20 is axially reciprocable within the casing 16 between the first piston 18 and the other end 22. A gas chamber 62 is defined by the space between the second piston 20 and the end cap 36 within the casing 16. A compressible gas, such as nitrogen, is sealed within the gas chamber 62 usually at a pressure of about 2,000 psi and is further compressed when the second piston 20 moves toward the end 22 of the casing. An essentially incompressible hydraulic oil or fluid is confined within a first fluid chamber 64 and a second fluid chamber 66. The first fluid chamber 64 is defined by the space between the bearing and seal assembly 28 and the first piston 18 within the casing 16. The second fluid chamber 66 is defined by the space between the first piston 18 and the second piston 20 within the casing 16. The hydraulic fluid is preferably of relatively high viscosity and suitable for high temperature applications up to at least 200° F.

To provide a fluid seal between the casing and the first piston and to separate the first and second fluid chambers, a wiper seal 68 is disposed in an annular groove 70 in the cylindrical surface 72 of the first piston 18. The first piston 18 has a first surface 74 in the first fluid chamber 64 and a second surface 76 in the second fluid chamber 66, both essentially flat. The second piston 20 has a cup shaped cylindrical body 80 with an essentially flat surface 82 in the second fluid chamber 66 and a cupped compression surface 84 in the gas chamber 62. To provide a fluid seal between the piston 20 and the casing 16 and hence the chambers 62 and 66, the outer cylindrical surface 86 of body 80 has a pair of seals 88 received in two recessed annular grooves 90.

The check valve 24 has a housing 116 press fit into a bore 118 in the piston 18 and communicates through a passage 120 with the first fluid chamber 64. A movable valve element 124 bears on a complementary seat 126 when closed to prevent the flow of fluid from the first chamber 64 to the second chamber 66 and when opened unseats to permit reverse fluid flow from the second to the first chamber.

In a preferred embodiment of the present invention, the delay valve assembly 26, as shown in FIGS. 1 and 2, is disposed within a valve chamber 142 in the first piston 18 for permitting the controlled flow of hydraulic fluid from the first fluid chamber 64 back to the second fluid chamber 66. A cylindrical bore 144 through the first piston 18 has a fluid inlet 146 communicating with the first fluid chamber 64. The bore 144 also has a fluid outlet 148 communicating with the valve chamber 142 which in turn communicates with the second fluid chamber 66 allowing fluid to pass from the first to the second fluid chamber when the delay valve 26 is open.

As shown in FIGS. 1 and 2, the valve chamber 142 comprises a cylindrical counterbore 150 opening axially into a surface 76 of the first piston 18 with an open end 152 communicating with the second fluid chamber 66 and another end 154 communicating with an axial blind bore 156. An annular groove 158 in the counterbore 150 communicates with the bore 144 through the fluid outlet 148. The blind bore 156 communicates with the first fluid chamber 64 through a first passage 160 and a second passage 162 opposing one another through the piston rod 12.

A metering orifice 164 is pressed into the first passage 160 for controllably regulating the rate of flow of hydraulic fluid from the first fluid chamber 64 through the first passage and into the blind bore 156 and hence the other end 154 of the counterbore 150. A mini one-way check valve 166 is pressed into a counterbore in the second passage 162 for allowing fluid to be purged from the other end 154 while preventing reverse flow of fluid through the second passage 162. The mini check valve 166 comprises a ball valve 168, a valve seat 170 and a compression spring 172. The spring 172 applies sufficient force on the ball valve 168 so that it remains in abutment with the seat 170 until the fluid pressure within the blind bore 156 and the other end 154 sufficiently exceeds the fluid pressure in the first fluid chamber.

Delay valve 26 has a cup shaped cylindrical body 180 having an open end 182 coinciding with the open end 152 of the counterbore 150 and a closed end 184 coinciding with the other end 154 of the counterbore 150. The outer surface of body 180 has an essentially uniform cylindrical section 186 adjacent the open end 182 and a ported section 188 adjacent the closed end of body 180. The ported section 188 has a series of the holes 190 through and spaced apart around the circumference of the body 180 for allowing fluid to pass from outside of the body 180 through the holes 190 into the hollow cupped portion of the body 180. As shown in FIG. 3, three annular grooves 192, 194, 196 are spaced apart along the body 180; groove 192 adjacent the capped end 184, groove 194 positioned between the uniform section 186 and the ported section 188, and groove 196 adjacent the open end 182 of the body 180. Each of the grooves 192, 194, and 196 retain an O-ring 193, 195, 197 for providing a seal between the valve body 180 and the valve chamber 142 thereby sealing the ported section from the uniform section.

The valve body 180 is retained within the valve chamber 142 by a snap ring 198 removably received in an annular groove 200 in the counterbore 150 adjacent the open end 152. When the valve body abuts the other end 154, the uniform section 186 overlies the outlet 148 of the bore 144, thereby preventing fluid flow through the bore 144. When the valve body abuts the snap ring 198, the ported section 188 and the holes 190 are aligned with the outlet 148 and the bore 144, thereby allowing fluid flow through the bore 144 and the holes 190, hence creating a flow path from the first fluid chamber 64 to the second fluid chamber 66.

In operation, the gas spring 10 has an external force applied to the piston rod as shown in FIGS. 1–3. On the downstroke as shown in FIG. 1, fluid pressure in the second fluid chamber 66 will be greater than the pressure in the first fluid chamber 64. The higher fluid pressure forces the delay valve body 180 to bottom out in the other end 154 of the counterbore 150 of the valve chamber 142. This forces any hydraulic fluid within the other end 154 to be purged through the second port 162 and mini check valve 166 into the first fluid chamber 64. The uniform section 186 then overlies the fluid outlet 148 of the bore 144 thereby closing off fluid communication between the second fluid chamber 66 and the first fluid chamber 64 through bore 144. The higher fluid pressure in the second fluid chamber also causes the check valve assembly 24 to open allowing fluid to freely flow from the second fluid chamber 66 to the first fluid chamber 64 through the bore 120.

Because the rate of change of the volume space within the first fluid chamber 64 is always less than the rate of change of the second fluid chamber 66, all of the hydraulic fluid cannot be transferred from the second chamber through the check valve 24 in the bore 118. The total volume of the chambers 64 and 66 remains constant while their relative volume changes as the hydraulic fluid is transferred. To maintain the constant total volume of the chambers 64 and 66, the second piston 20 is moved axially toward the other end 22 of the casing 16 which compresses the gas within the gas chamber 62.

FIG. 2 illustrates the gas spring in an equilibrium state where the first piston has stopped moving towards the other end 22 of the gas spring and not yet started to move toward the one end 14. This bottom of stroke condition is achieved when the external force applied to the piston rod is equivalent to the force applied by the compressed gas within the gas chamber 62. As the external force is removed from the rod, the force applied to the second piston 20 by the gas within the gas chamber 62 creates a higher pressure condition in the first fluid chamber 64 thereby closing the check valve 24. This prevents fluid from returning through the bore 118 from the first fluid chamber 64 back to the second fluid chamber 66. The higher pressure within the first fluid chamber 64 also forces the mini check valve 166 to close thereby preventing fluid from passing through the second passage 162 into the other end 154 of the valve chamber 142.

The delay valve body 180 remains bottomed against the other end 154 within the valve chamber 142, hence the uniform section 186 of the valve body, aligned with the bore 144, prevents fluid from passing from the first fluid chamber 64 through the bore back to the second fluid chamber 66. Thus, fluid within the first fluid chamber can only pass through the metering orifice 164 in the first passage 160 and into the blind bore 156 and hence the other end 154. As fluid gradually passes through the metering orifice into the blind bore and other end of the valve chamber, the valve body 180 is gradually forced to move toward and bottom against the snap ring 198.

Since the hydraulic fluid is essentially incompressible, the first piston 18 and rod 12 dwell in the bottom of stroke position shown in FIG. 2 until the holes 190 in the valve body 180 are aligned with the fluid outlet 148 of the bore 144. The dwell time is controlled by varying the flow characteristics of the metering orifice 164 and the fluid volume necessary to move the delay valve body 180 from the other end of the valve chamber into abutment with the snap ring. Once the holes 190 are aligned with the annular groove 158, fluid from the first fluid chamber 64 can pass through the bore 144 into the groove 158, through the holes 190, the open end 152 of the valve chamber, the open end 182 of the delay valve, and into the second fluid chamber 66. The first piston 18 and the piston rod 12 will then move through the return stroke as shown in FIG. 3 to their fully extended positions.

The heavy loads and high fluid pressures within the gas spring (in the range of 2000–6000 psi) cause high operating temperatures. Preferably, the temperature should remain at about 140°–160° F. To prevent degradation of the hydraulic fluid, the temperature within the cylinder should not exceed about 200° F. In order to control the operating temperature, a number of cooling techniques may be employed. Cool water may be run through a coil wrapped around the cylinder, a cool water jacket may be wrapped around the cylinder, or compressed air may be continuously or intermittently blown onto the cylinder.

Figure 5:
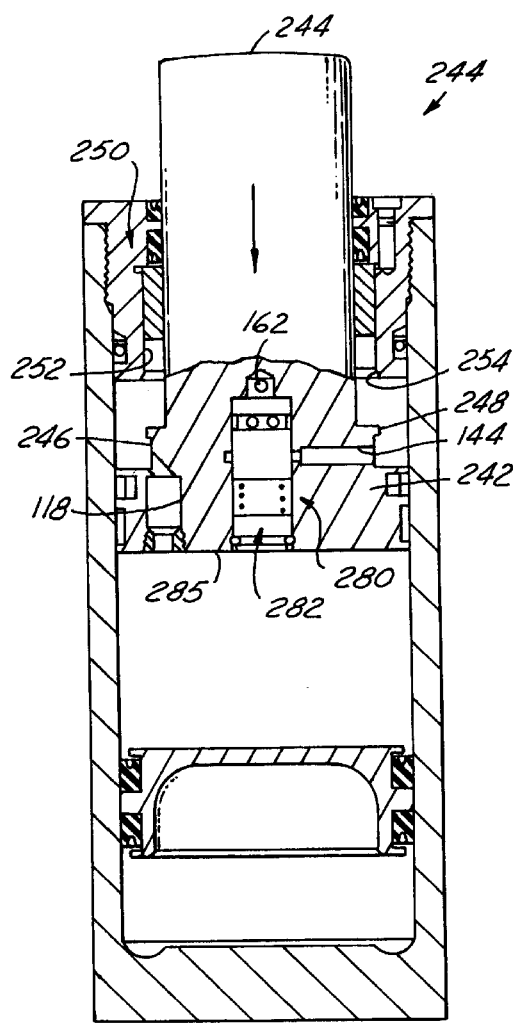
FIG. 5 is a fragmentary sectional view of the gas spring of FIG. 4 with the rod in its fully extended position and the delay valve in its open position.
Figure 6:
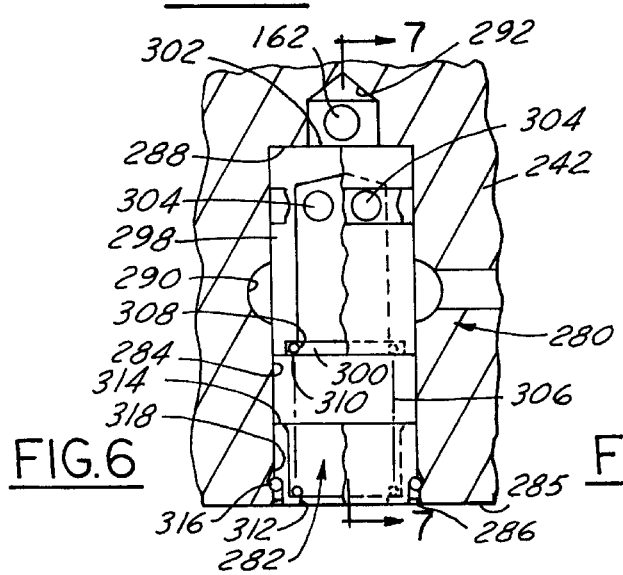
FIG. 6 is an enlarged and fragmentary sectional view of the delay valve as shown in FIG. 4.

In another preferred embodiment of the invention as shown in FIGS. 4–6, a gas spring 240 embodying this invention has an added feature that provides a return cushion for a first piston 242 and rod 244 and provides a desired high initial force necessary to start the first piston and rod on the downward compression stroke. The piston rod 244 has a larger diameter cylindrical shoulder 246 extending radially outwardly from the rod. The shoulder 246 abuts the first piston 242 at one end and has a larger diameter radially outwardly extending flange 248 at its opposite end. A bearing and seal assembly 250 has a corresponding recessed annular counterbore 252 having a radially outwardly tapered edge 254 for receiving the shoulder 246 and the flange 248 when the piston 242 and rod 244 are in their fully extended position.

In operation, as the first piston 242 and rod 244 move toward their fully extended position, the flange 248 enters the counterbore 252 trapping hydraulic fluid within the counterbore. To control the rate at which the hydraulic fluid can bleed by the flange 248, a radial clearance of about 0.010 inches is preferred between the flange and the counterbore. The trapped hydraulic fluid provides a cushion between the shoulder 246 and the bearing and seal assembly 250 as the piston and rod move toward the extended position, and is then bled between the flange 248 and the counterbore 252 which allows the shoulder 246 to fully extend into the counterbore.

A desired higher initial load to start the first piston 242 on its downward stroke is also achieved by the structure of this embodiment. As the piston 242 begins to move toward its retracted position, the shoulder 246 and flange 248 begin to withdraw from the counterbore 252. The tight clearance between the flange and counterbore prohibits fluid from freely passing around the flange into the evacuated space on the side of the flange facing the counterbore. As the first piston 242 moves toward the other end of the casing 16, the volume of the first fluid chamber 64 increases. The tight radial clearance between the flange and the counterbore essentially preventing fluid from filling the evacuated space momentarily reduces the volume change rate of the first fluid chamber. Thus, initial displacement of the rod and first piston yields less fluid transfer from the second to the first fluid chamber and hence greater displacement of the second piston. This produces greater initial compression of the gas in the gas chamber and thus a higher initial resistance to movement of the rod and first piston. The higher initial resistance is also enhanced by the vacuum momentarily existing in the evacuated space. Once the flange 248 travels axially beyond the counterbore 252, the gas spring 240 functions like the gas spring 10 described in the previous embodiment.

Figure 7:
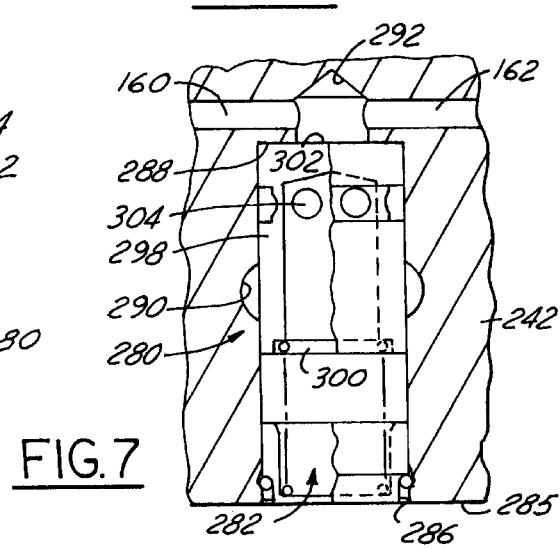
FIG. 7 is a fragmentary sectional view of the delay valve taken along line 7—7 of FIG. 6.

Another feature of the gas spring 240 is the elimination of the O-rings 193, 195 and 197 from the delay valve assembly. As shown in FIG. 6, the delay valve assembly 280 has a valve chamber 282 in the first piston 242. The valve chamber 282 comprises a cylindrical counterbore 284 opening axially into a surface 285 of the first piston 242 with an open end 286 communicating with the second fluid chamber 66 and another end 288 communicating with a blind bore 292. An annular groove 290 in the counterbore 284 communicates with bore 144 through fluid inlet 148. The blind bore 292 communicates with the first fluid chamber 64 through the first passage 160 and the second passage 162 opposing one another through the shoulder 246 and offset 90° from the bore 116 and the bore 144 as shown in FIGS. 5–7. Though not shown in this embodiment, the metering orifice 164 is pressed into the first passage 160 and the mini check valve 166 is pressed into the second passage 162 and both function as previously described.

Delay valve assembly 280 has a cup shaped cylindrical body 298 having an open end 300 coinciding with the open end 286 of the counterbore 284 and a closed end 302 coinciding with the other end 288 of the counterbore 284. The outer surface of the body 298 is an essentially cylindrical surface having a series of holes 304 through and spaced apart around the circumference of the body 298 near the closed end 302.

By eliminating grooves 192, 194 and 196 and O-rings 193, 195 and 197, this embodiment relies on a close tolerance sliding fit between the delay valve body 298 and the cylindrical counterbore 284 of the valve chamber to prevent substantially all flow of fluid between them. Any insignificant leakage of hydraulic fluid may be accounted for in the design of the metering orifice and the delay chamber. Hydraulic fluid may then only flow from the first chamber 64 to the second chamber 66 when the delay valve is positioned such that the holes 304 are aligned with the bore 144.

To ensure that the delay valve remains in its closed position until fluid pressure in the closed end of the valve chamber forces it to open, one end of a compression spring 306 is disposed in a recess 308 in the open end of the body 298. The other end of the compression spring is received on a shoulder 312 of an annular retaining ring 314 inserted into the open end of the bore 284 and retained in the open end by a split ring 316 received in a groove 318 in the counterbore and on a shoulder 320 of the ring.

Another feature of the gas spring 240, as shown in FIGS. 4 and 5, is an alternative bearing and seal assembly attachment and structure 250. The bearing and seal assembly 250 has external threads 330 for engaging complimentary internal threads adjacent the end 14 of the casing 16 to attach the bearing and seal assembly to the casing. The assembly 250 also includes a threaded bleed screw 334 received within a bore 336 having complimentary threads 338 for bleeding air from within the casing 16. A pocket 340 formed between the bearing 42 and seal housing 38 communicates with the bore 336 allowing air passing between the bearing 42 and housing 38 to be bled from the cylinder upon opening the bleed screw. This permits air to be bled from the hydraulic fluid in the chambers 64 and 66 and the associated valves 22 and 26 and related passages.

What is claimed is:

1. A gas spring comprising,
    an elongate tubular casing having a pair of spaced apart ends,
    an axially reciprocable rod received within and protruding from one end of said casing and moveable between extended and retracted positions,
    a first piston within said casing and connected to said rod for movement therewith,
    a second piston within said casing and disposed between said first piston and the other end of said casing,
    said first piston in cooperation with said casing defining a first fluid chamber between said one end of said casing and said first piston, said first fluid chamber receiving therein an essentially incompressible liquid hydraulic fluid,
    said first and second pistons in cooperation with said casing defining a second fluid chamber receiving therein said liquid hydraulic fluid,
    said second piston in cooperation with said casing defining a third chamber between said other end of said casing and said second piston, said third chamber receiving therein a compressed gas under pressure which yieldably urges the first piston and rod to the extended position of the rod,
    at least one check valve carried by said first piston and constructed and arranged to permit flow of the liquid hydraulic fluid from said second fluid chamber to said first fluid chamber when open and to prevent flow of the liquid hydraulic fluid from said first fluid chamber to said second fluid chamber when closed, each of said at least one check valve being closed while the rod and first piston are moving toward their extended position,
    a delay valve carried by said first piston and constructed and arranged to permit flow of said liquid hydraulic fluid from said first fluid chamber to said second fluid chamber when open, to prevent flow of said liquid hydraulic fluid from said second fluid chamber to said first fluid chamber when closed, and remains closed to delay the flow of said liquid hydraulic fluid from said first fluid chamber to said second fluid chamber while each said at least one check valve is closed and after said first piston completes moving toward said other end of said casing and is disposed and urged to move toward said one end of said casing by said compressed gas in said first chamber and liquid hydraulic fluid in said second chamber, said casing being constructed to retain a constant quantity of said liquid hydraulic fluid, and said casing, first piston, and at least one check valve and delay valve are constructed and arranged so that all of the liquid hydraulic fluid flowing into and between the first and second chambers is controlled by and occurs solely through the check and delay valves.

2. The gas spring according to claim 1 wherein said delay valve delays the flow of the hydraulic fluid from said first fluid chamber to said second fluid chamber for a determinable time after said first piston completes moving toward said other end of said casing and before the first piston begins substantially moving toward said one end of said casing.

3. The gas spring according to claim 1 wherein said delay valve comprises, a valve chamber and a valve body disposed within said chamber and reciprocable between open and closed positions, preventing flow of hydraulic fluid from said first fluid chamber to said second fluid chamber when closed and permitting flow of the hydraulic fluid when open.

4. The gas spring according to claim 3 wherein said delay valve further comprises a first port to controllably bleed hydraulic fluid from said first fluid chamber into said valve chamber forcing said valve body to move to its open position.

5. The gas spring according to claim 4 wherein said first port includes a metering orifice to controllably bleed said hydraulic fluid into said valve chamber.

6. The gas spring according to claim 4 wherein said delay valve further comprises a second port to purge hydraulic fluid from said valve chamber when said valve body moves to its closed position.

7. The gas spring according to claim 6 wherein said second port includes a check valve permitting fluid to flow through said second port from said valve chamber into said first fluid chamber and preventing fluid from flowing back through said second port into said valve chamber.

8. The gas spring according to claim 3 wherein said valve chamber and said valve body communicate directly with said second fluid chamber whereby said valve body when in its open position allows hydraulic fluid to flow from said first fluid chamber through said valve body into said second fluid chamber.

9. The gas spring according to claim 8 wherein said valve body is a cup shaped cylinder having a side wall, a closed end and an open opposite end wherein said cylinder has at least one hole passing through said side wall of said cylinder.

10. The gas spring according to claim 9 wherein said cylinder has two or more of said holes.

11. The gas spring according to claim 1 wherein said rod includes a shoulder and said one end of said casing includes a complementary recess for receiving said shoulder when said piston is in its extended position.

12. The gas spring according to claim 11 wherein said shoulder includes an outwardly extending annular flange disposed at the edge of said shoulder nearest said recess for being received in said recess.

13. The gas spring according to claim 12 wherein said flange and said recess have a diametrical clearance therebetween of about 0.010 of an inch.

14. The gas spring according to claim 1 wherein said one end of said casing includes a bleed valve for releasing air from said first fluid chamber.

15. A gas spring comprising, an elongate tubular casing having a pair of spaced apart ends, an axially reciprocable rod received within and protruding from one end of said casing and moveable between extended and retracted positions, a first piston within said casing and connected to said rod for movement therewith, a second piston within said casing and disposed between said first piston and the other end of said casing, said first piston in cooperation with said casing defines a first fluid chamber for receiving therein an essentially incompressible liquid hydraulic fluid, said first and second pistons in cooperation with said casing define a second fluid chamber for receiving therein said liquid hydraulic fluid, said second piston in cooperation with said casing defines a third chamber for receiving therein a compressed gas under pressure which yieldably urges the first piston and rod to the extended position of the rod, at least one check valve carried by said first piston and constructed and arranged to permit flow of said liquid hydraulic fluid from said second fluid chamber to said first fluid chamber when open and to prevent flow of the liquid hydraulic fluid from said first fluid chamber to said second fluid chamber when closed, each of said at least one check valve being closed while the rod and first piston are moving toward their extended position, and a delay valve carried by said first piston and constructed and arranged to permit flow of said liquid hydraulic fluid from said first fluid chamber to said second fluid chamber when open, to prevent flow of said liquid hydraulic fluid from said second fluid chamber to said first fluid chamber when closed, and to remain closed and delay the flow of liquid hydraulic fluid from said first fluid chamber to said second fluid chamber while each of said at least one check valve is closed for a determinable time after said first piston completes moving toward said other end of said casing and before the first piston begins substantially moving toward the said one end of the casing, said delay valve comprising a valve chamber and a valve body disposed within said chamber and reciprocable between open and closed positions, and said casing being constructed to retain a constant quantity of said liquid hydraulic fluid.

* * * * *

UNITED STATES PATENT AND TRADEMARK OFFICE
CERTIFICATE OF CORRECTION

PATENT NO. : 5,823,513
DATED : October 20, 1998
INVENTOR(S) : Sven Stenquist

It is certified that error appears in the above-identified patent and that said Letters Patent is hereby corrected as shown below:

In Column 8, line 30, delete "first" and insert instead -- third --.

Signed and Sealed this

Sixth Day of April, 1999

Attest:

Q. TODD DICKINSON

*Attesting Officer*　　　*Acting Commissioner of Patents and Trademarks*